United States Patent Office 3,510,544
Patented May 5, 1970

3,510,544
DIGUAIACYL PHOSPHATE SALT OF TETRACYCLINE
André Allais, Les Lilas, and Michel Paturet, Sucy-en-Brie, France, assignors to Roussel-UCLAF, Paris, France, a corporation of France
No Drawing. Filed June 27, 1967, Ser. No. 649,145
Int. Cl. C07f 9/08; A61k 27/00
U.S. Cl. 260—925                    1 Claim

ABSTRACT OF THE DISCLOSURE

Diguaiacyl phosphate salt of tetracycline of the formula:

I

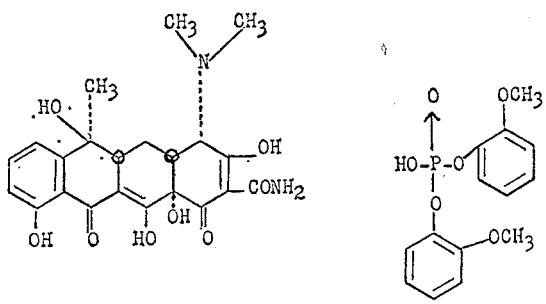

and its preparation and antibiotic and bactericidal compositions and method.

PRIOR ART

The always present problem of the antibiotherapy with tetracycline or its salts is due to the numerous gastric or intestinal intolerances caused by this antibiotic. Specifically, the appearance of tetracyclino-resistant staphylococcus strains in the intestine or the presence of Candida albicans responsible for a great number of digestive disturbances has been ascertained. The solutions to these problems used until now have consisted of complexing agents, decreasing or spreading out the doses, or by administration of lacteal products in large quantities to prevent the disappearance of intestinal flora and the simultaneous development of pathogenic fungus responsible for digestive disturbances. Furthermore, until now it has been possible to partially remedy the phenomena of gastric irritation by associating tetracycline with a complexing agent of basic character, but this has the obvious disadvantage that patients have to absorb considerable quantities of alkaline products. Lastly, tetracycline acts less rapidly in the organism when disguised by a complexing agent.

OBJECTS OF THE INVENTION

It is an object of the invention to provide the novel salt, diguaiacyl phosphate salt of tetracycline of Formula I.

It is another object of the invention to provide a novel process for the preparation of diguaiacyl phosphate salt of tetracycline.

It is an additional object of the invention to provide novel antibiotic compositions.

It is a further object of the invention to provide a novel method of combatting bacterial infections in warm-blooded animals.

These and other objects and advantages of the invention will become obvious from the following detailed description.

THE INVENTION

The novel product of the invention is diguaiacyl phosphate salt of tetracycline of Formula I which possesses interesting pharmacological properties, particularly an important antibiotic and bactericidal acitivity. The diguaiacyl phosphate salt of tetracycline has the advantage of possessing in animals or in human therapeutics a therapeutic activity at least equal to that of tetracycline without any evidence whatsoever of digestive intolerance of any nature. Clinical tests have shown that even after prolonged or intensive treatment the product is perfectly tolerated and does not involve any digestive disturbance at all. Finally, in the case of broncho-pneumopathies, the effect of the diguaiacyl phosphate group aids in abating the frequency of coughing spells and in entailing a rapid apyrexia.

Diguaiacyl phosphate salt of tetracycline differs from guaiacol sulfonate salt of tetracycline, described in Belgian Pat. No. 668,073, by a perfect stability and by a distinct superiority of action since the latter salt is always of inferior activity compared with that of equal molar amounts of tetracycline hydrochloride.

The process of the invention for the preparation of diguaiacyl phosphate salt of tetracycline comprises effecting a double decomposition between tetracycline hydrochloride and diguaiacyl phosphate salt of triethylamine to form diguaiacyl phosphate salt of tetracycline and recovering the latter. The double decomposition is preferably effected at room temperature in an aqueous medium.

Other tetracycline salts, preferably mineral acid salts, and other diguaiacyl phosphates preferably trialkylamino derivatives, can be employed if desired.

The novel antibiotic compositions of the invention are comprised of a safe and effective amount of diguaiacyl phosphate of tetracycline and a major amount of a pharmaceutical carrier. The compositions may be in the form of injectable solutions or suspensions put up in ampules or multiple dose flacons, in tablets, coated tablets, aromatized powders, granules, emulsions, syrups, suppositories, ovules, intravaginal tablets, ointments, nose or ear drops, mouth washes or in pulverized topical powders prepared in known manners.

The compositions are useful for the treatment of staphylococci, streptococci and infections caused by gram negative germs such as colibacillus and typhoid bacillus. The association of diguaiacyl phosphate and tertacycline in the same molecule has a distinct synergistic effect which has been clearly shown in numerous clinical tests with gram negative or gram positive bacteria. The therapeutic efficacy of diguaiacyl phosphate salts of tetracycline is always superior to that of tetracycline hydrochloride when orally administered.

The novel method of the invention of combatting bacterial infections in warm-blooded animals comprises administering to warm-blooded animals a safe and effective amount of diguaiacyl phosphate salt of tetracycline. The said salt may be administered orally, rectally, transcutaneously or by local application to the skin or mucous membranes. The usual useful daily dosage is 8 to 50 mg./kg. for the adult depending upon the method of administration.

In the following example there are described several preferred embodiments to illustrate the invention. However, it should be understood that the invention is not intended to be limited to the specific embodiments.

EXAMPLE

Preparation of diguaiacyl phosphate salt of tetracycline

Step A: Preparation of diguaiacyl phosphoric acid chloride.—20 gm. of guaiacol and 7.3 cc. of phosphorus oxychloride were admixed and heated for 24 hours at 240° C. and the resulting solution was rectified under vacuum to obtain 15.83 gm. of diguaiacyl phosphoric acid chloride having a boiling point of 192°±2° C. at 0.7 mm. Hg.

Step B: Preparation of diguaiacyl phosphoric acid.—15.83 gm. of diguaiacyl phosphoric acid chloride were dissolved in 16 cc. of pyridine and then 3 cc. of water were added under agitation and while cooling. The solution obtained was allowed to stand for 30 minutes after which 50 cc. of water were added and the solution was brought to a pH value of 1 with hyrochloric acid. Then the reaction solution was extracted with ethyl acetate, dried over sodium sulfate, filtered and concentrated to dryness in vacuo to obtain 14.35 gm. of diguaiacyl phosphoric acid.

Step C: Preparation of triethylamine salt of diguaiacyl phosphoric acid.—14.35 gm. of diguaiacyl phosphoric acid were dissolved in 30 cc. of benzene and 5 cc. of ethanol. Next, triethylamine was added to obtain an alkaline pH value, and the solution was concentrated to dryness. The residue was triturated in ether, vacuum filtered and dried in vacuo to obtain 16.6 gm. of triethylamine diguaiacyl phosphate having a melting point of about 80° C. The product occurred as colourless prisms which were soluble in water and alcohol and insoluble in ether.

Analysis.—$C_{20}H_{30}NPO_6$; molecular weight=411.43. Calculated (percent): C, 58.38; H, 7.35; N, 3.40. Found (percent): C, 58.3; H, 7.2; N, 3.4.

This product has already been described by N. S. Corby et al., J. Chem. Soc., 1952, p. 1234.

Step D: Preparation of diguaiacyl phosphate salt of tetracycline.—9.62 gm. of tetracycline hydrochloride were dissolved in 75 cc. of water and then a solution of 8.23 gm. of diguaiacyl phosphate salt of triethylamine in 16.5 cc. of water was added thereto. The precipitate, which was triturated in water, was vacuum filtered and dried in vacuo at room temperature to obtain 10.40 gm. (69% yield) of diguaiacyl phosphate salt of tetracycline having a specific rotation $[\alpha]_D^{20} = -152° \pm 2.5°$ (c.=1% in dimethylformamide). It occurred in the form of a solid yellow product which was soluble in alcohol, slightly soluble in water and insoluble in ether, acetone and benzene.

Analysis.—$C_{36}H_{39}N_2O_{14}P$; molecular weight=754.67. Calculated (percent): C, 57.29; H, 5.21; N, 3.71; P, 4.11. Found (percent): C, 57.3; H, 5.4; N, 3.6; P, 4.2.

Ultraviolet spectra in ethanol—N/10 hydrochloric acid

λmax. 218 mμ      $E_{1\,cm.}^{1\%} = 377$

λmax. 269–270 mμ      $E_{1\,cm.}^{1\%} = 301$

λmax. 362 mμ      $E_{1\,cm.}^{1\%} = 199$

This compound is not described in the literature.

PHARMACEUTICAL EXAMPLES

Example I

Preparation of sugar coated tablets.—3.920 kg. of diguaiacyl phosphate salt of tetracycline, 0.100 kg. of cornstarch and 1,800 kg. of rice starch were introduced into a Guedu type horizontal mixer and the mixture was homogenized by rotation for 3 minutes. Atomized distilled water was sprayed onto this tumbling mass under continuous agitation until grains developed and the grains were immediately dried for 30 minutes in an Aeromatic type apparatus regulated at 40° C.

The dried granules were then introduced into a turbine of sufficient size and 0.0534 kg. of talc and 0.0266 kg. of magnesium stearate were incorporated into the said mass and the mixture was rotated for 15 minutes. The resulting granules were compressed in a compression apparatus of alternative or rotative type provided with 11 mm. punches of φ and having an inflexion radius of 10 whereby tablets weighing 590 mg.±5 per 100 were obtained. The resulting dust-free tablets were introduced into an anti-deflagrating turbine and 20 gm. of Eudragit E (polymethacrylate from butyl methacrylate and dimethylamine ethyl methacrylate) in acetone solution was added in small fractions to the tumbling tablets. The resulting kernels were removed and divided onto trays placed in an air drying chamber at 37° C. provided with an anti-deflagrating device.

The dried kernels were then sugar coated by known methods with a mixture of 2.5 kg. of lump sugar 0.025 kg. of gum arabic and 1000 ml. of distilled water in a turbine to obtain tablets having an average weight of 840 mg. 1 kg. of lump sugar in 375 ml. of distilled water was used to apply a glaze to the said kernels to obtain an average weight of 940 mg. after which the kernels were colored with a solution of 1.500 kg. of lump sugar, 25 ml. of a 5% aqueous solution of tartrazine yellow, 6 ml. of a 5% aqueous solution of sunset yellow and 560 ml. of distilled water to obtain 10,000 tablets having an average weight of 1100 mg. which were then polished with beeswax. Each tablet content corresponds to 250 mg. of tetracycline hydrochloride.

PHARMACOLOGICAL STUDY

(1) Antibiotic activity "in vitro"

The amount of tetracycline base in guaiacyl phosphate salt of tetracycline was determined by opacimetric measurement with the air of cultures of Staphylococcus aureus (ATCC 9 144) and was found to be 590 μg./mg.

The activity "in vitro" was determined in a liquid medium of Oxoid No. 2 at a pH value of 7.5 after 24 hours of incubation of 37° C., with various pathogenic gram positive and gram negative strains isolated with swabs taken on patients in different hospitals. The test for antibiotic activity was conducted in comparison with that of tetracycline hydrochloride at the same dose of tetracycline base by means of the method of dilutions in liquid media. The inhibitary concentrations (in μg./cc.) observed on the studied strains are set forth in Table I.

TABLE I

| Strains | Diguaiacyl salt phosphate of tetracycline | Tetracycline hydrocholride |
|---|---|---|
| Staphylococcus aureus hemolytique L.W.[1] | ≤0.1 | ≤0.1 |
| Staphylococcus aureus hemolytique No. 6,075[1] | 200 | 200 |
| Staphylococcus aureus pathogene No. 2,387[1] | 0.05 | 0.2 |
| Staphylococcus aureus pathogene No. 6,091[1] | 0.1 | 0.2 |
| Staphylococcus aureus pathogene No. 8,605[1] | 0.1 | 0.2 |
| Proteus vulgaris No. 2,070–A[1] | 0.2 | 1 |
| Escherichia coli No. 026 B 6[1] | ≤0.1 | 1 |
| Klebsellia pneumoniae No. A–215[1] | ≤0.1 | 0.4 |
| Pseudomonas pyocyanea | 5 | 20 |

[1] Private identification system.

Table I shows that with respect to the sensitive strains, the diguaiacyl phosphate salt of tetracycline represented generally an activity superior to that of tetracycline hydrochloride, at the same dose of tetracycline base. This higher degree of activity corresponds with a synergistic action of diguaiacyl phosphate and of tetracycline in the form of the diguaiacyl phosphate salt of tetracycline.

(2) Determination "in vivo" of the therapeutic efficacy (a) Infections with staphylococci.—Groups of 10 mice each were infected intraperitoneally with 0.30 cc. of a 1/100 culture of staphylococci (TIN strain). For two consecutive days, the mice were orally treated with (1st dose immediately after the inoculation, the 2nd dose 16 hours thereafter) diguaiacyl phosphate salt of tetracycline in comparison with tetracycline hydrochloride, at the same dose of tetracycline base (1 mg. of tetracycline hydrochloride corresponding with 1.49 mg. of diguaiacyl phosphate salt of tetracycline). The therapeutic effect was determined by the ratio of mortality among the animals as a function of time and importance of lesions. The results obtained are set forth in Table II.

TABLE II

| Product administered | Single dose per mouse (mg.) | Therapeutic action, percent |
|---|---|---|
| Diguaiacyl phosphate salt of tetracycline. | 0.74 | 100 |
|  | 0.37 | 98 |
|  | 0.15 | 42 |
| Tetracycline hydrochloride | 0.50 | 96 |
|  | 0.25 | 86 |
|  | 0.15 | 38 |

Table II shows the synergistic effect of diguaiacyl phosphate salt of tetracycline (which contained 58.8% of base substance) as its therapeutic action was found to be superior to that of tetracycline hydrochloride (at the equivalent dose of tetracycline base).

(b) Infections with hemolytic streptococci.—In experimental infections caused by inoculation with a culture of hemolytic streptococci (M strain) to groups of 10 mice each, the therapeutic effect observed, after oral administration of diguaiacyl phosphate salt of tetracycline or of tetracycline hydrochloride for 4 consecutive days at the same molar dose of tetracycline base, was as shown in Table III.

TABLE III

| Product administered | Single dose per mouse (mg.) | Therapeutic action, percent |
|---|---|---|
| Diguaiacyl phosphate salt of tetracycline. | 2.98 | 87.5 |
|  | 0.74 | 76 |
| Tetracycline hydrochloride | 2 | 88 |
|  | 0.50 | 73 |

In this test, the therapeutic effect of diguaiacyl phosphate salt of tetracycline was approximately equal to that obtained with tetracycline hydrochloride at the strongest dose, but was more considerable at the weakest dose.

(c) Infections with colibacilli.—Groups of 10 mice each were inoculated with a culture of *Escherichia coli* (STAR strain) after which a single dose of diguaiacyl phosphate salt of tetracycline or of tetracycline hydrochloride was orally administered. The therapeutic effects obtained are shown in Table IV.

TABLE IV

| Product administered | Single dose per mouse (mg.) | Therapeutic action, percent |
|---|---|---|
| Diguaiacyl phosphate salt of tetracycline. | 0.74 | 100 |
|  | 0.37 | 74 |
| Tetracycline hydrochloride | 0.50 | 91 |
|  | 0.25 | 73 |

Table IV shows the synergistic effect of diguaiacyl phosphate salt of tetracycline as its therapeutic action was perceptibly superior to that of tetracycline hydrochloride, at equal molar dose of tetracycline base.

(d) Infections with typhoid bacilli.—The test was conducted on groups of 10 mice each inoculated with a culture of *Salmonella typhosa* (original clinical strain). The diguaiacyl phosphate salt of tetracycline was orally administered in one single dose. The therapeutic effect observed, in comparison with that of tetracycline hydrochloride at the same molar dose of tetracycline base, was as shown in Table V.

TABLE V

| Product administered | Single dose per mouse (mg.) | Therapeutic action, percent |
|---|---|---|
| Diguaiacyl phosphate salt of tetracycline. | 2.98 | 80 |
|  | 1.49 | 56 |
| Tetracycline hydrochloride | 2 | 59 |
|  | 1 | 26 |

Table V shows that diguaiacyl phosphate salt of tetracycline showed a therapeutic action distinctly superior to that of tetracycline hydrochloride at equal molar dose of tetracycline base.

(e) Infections with pneumococci.—In infections induced on groups of 10 mice each by inoculation with a culture of *Diplococcus pneumoniae* (strain II), the therapeutic effect was observed after oral administration of diguaiacyl phosphate salt of tetracycline or of tetracycline hydrochloride at the same molar dose of tetracycline base for 4 consecutive days. The results are shown in Table IV.

TABLE VI

| Product administered | Single dose per mouse (mg.) | Therapeutic action, percent |
|---|---|---|
| Diguaiacyl phosphate salt of tetracycline. | 2.98 | 68 |
|  | 1.49 | 53 |
| Tetracycline hydrochloride | 2 | 43 |
|  | 1 | 36 |

Table VI shows that the therapeutic effect of diguaiacyl phosphate salt of tetracycline is distinctly superior to that of tetracycline hydrochloride at equal molar dose of tetracycline base in infections with pneumococci with a prolonged treatment for 4 days.

Determination of toxicity (1) Acute toxicity.—Diguaiacyl phosphate salt of tetracycline was orally administered as an aqueous suspension at doses of 2.25 and 4.5 g./kg. to groups of 10 mice each. The animals were kept under observation for 10 days. Neither symptoms of intoxication nor any mortality were noted and, therefore, the $LD_{50}$ was higher than 4.5 g./kg. under the test conditions.

(2) Semi-chronic toxicity.—Diguaiacyl phosphate salt of tetracycline was administered to groups of 10 mice each at a dose of 150 mg./kg. for several consecutive days. The product proved to be very well tolerated. Therefore, diguaiacyl phosphate salt of tetracycline proved to be practically free of all toxicity.

Various modifications of the compositions and method of the invention may be made without departing from the spirit or scope thereof.

We claim:
1. Diguaiacyl phosphate salt of tetracycline.

References Cited

UNITED STATES PATENTS 2,023,551   12/1935   Rosenzweig.

CHARLES B. PARKER, Primary Examiner

A. H. SUTTO, Assistant Examiner

U.S. Cl. X.R.

260—951, 987, 559; 424—199